United States Patent [19]

Barker

[11] Patent Number: 4,925,202
[45] Date of Patent: May 15, 1990

[54] THREE-WHEELED PEDAL-PROPELLED CYCLE WITH FRONT AND REAR BRAKES

[76] Inventor: Fred E. Barker, 3022 10th St., Rockford, Ill. 61109

[21] Appl. No.: 334,163

[22] Filed: Apr. 6, 1989

[51] Int. Cl.⁵ ........................... B62K 5/04; B62M 1/02
[52] U.S. Cl. ..................................... 280/261; 280/263; 280/264; 280/270; 280/282
[58] Field of Search ............... 280/263, 264, 270, 271, 280/259, 260, 261, 262, 268, 282, 827, 828

[56] References Cited

U.S. PATENT DOCUMENTS

| | | | |
|---|---|---|---|
| 364,466 | 6/1887 | Bate | 280/261 X |
| 387,631 | 8/1888 | Duryea | 280/261 |
| 621,034 | 3/1899 | Cordle | 280/261 |
| 1,404,274 | 1/1922 | Cooper | 280/1.21 |
| 1,434,105 | 10/1922 | Douthitt | 280/1.12 |
| 1,778,143 | 10/1930 | Carlson | 280/259 |
| 2,177,793 | 10/1939 | Taylor | 280/215 |
| 2,995,378 | 8/1961 | Whetstone | 280/261 X |
| 3,403,927 | 10/1968 | Rettger, Jr. | 280/261 |
| 4,451,064 | 5/1984 | Perkins | 280/259 |

FOREIGN PATENT DOCUMENTS

| | | | |
|---|---|---|---|
| 71733 | 1/1976 | Australia | 280/261 |
| 1096982 | 6/1955 | France | 280/270 |

*Primary Examiner*—Mitchell Hill
*Attorney, Agent, or Firm*—Leydig, Voit & Mayer

[57] ABSTRACT

A pedal-propelled tricycle includes two front wheels, a rear wheel, a pedal drive and a handle bar. The pedal drive serves to rotate the axle of one front wheel by way of a chain while a brake on the axle of the other front wheel is adapted to be operated from an actuator on the handle bar. The handle bar serves to steer the rear wheel and carries a second actuator for operating a brake on the rear wheel.

Claims, 4 Drawing Sheets

U.S. Patent May 15, 1990 Sheet 1 of 4 4,925,202
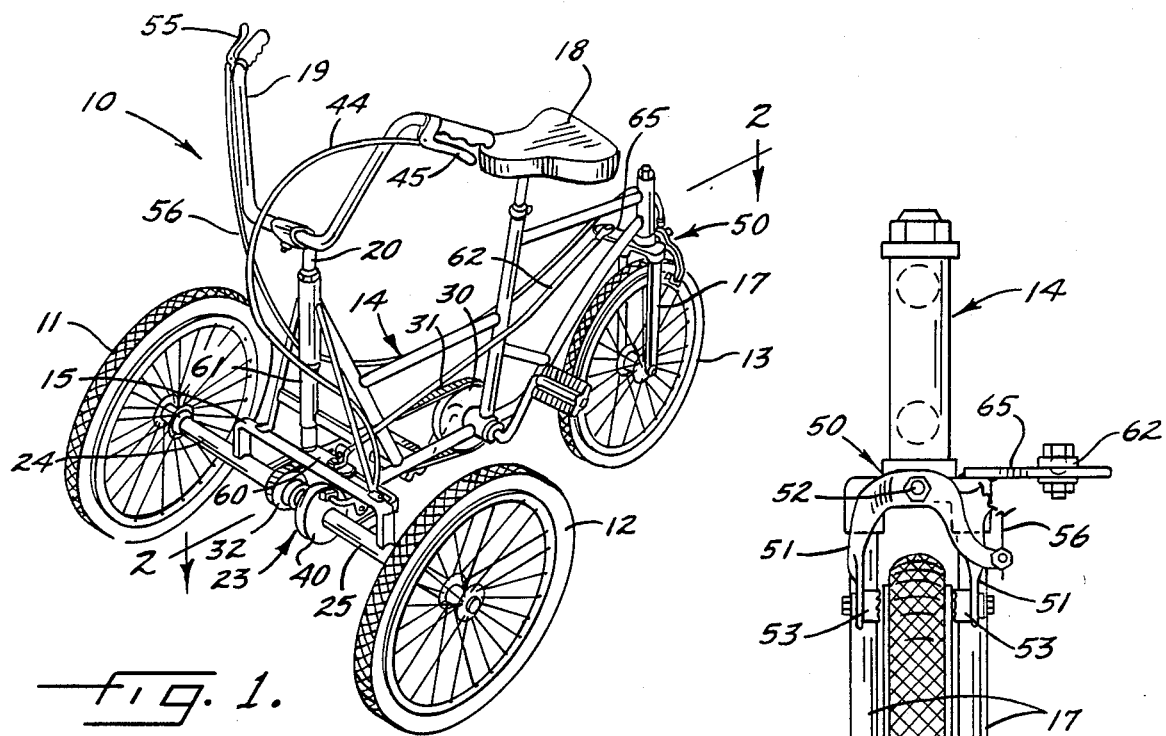
fig. 1.
fig. 3.
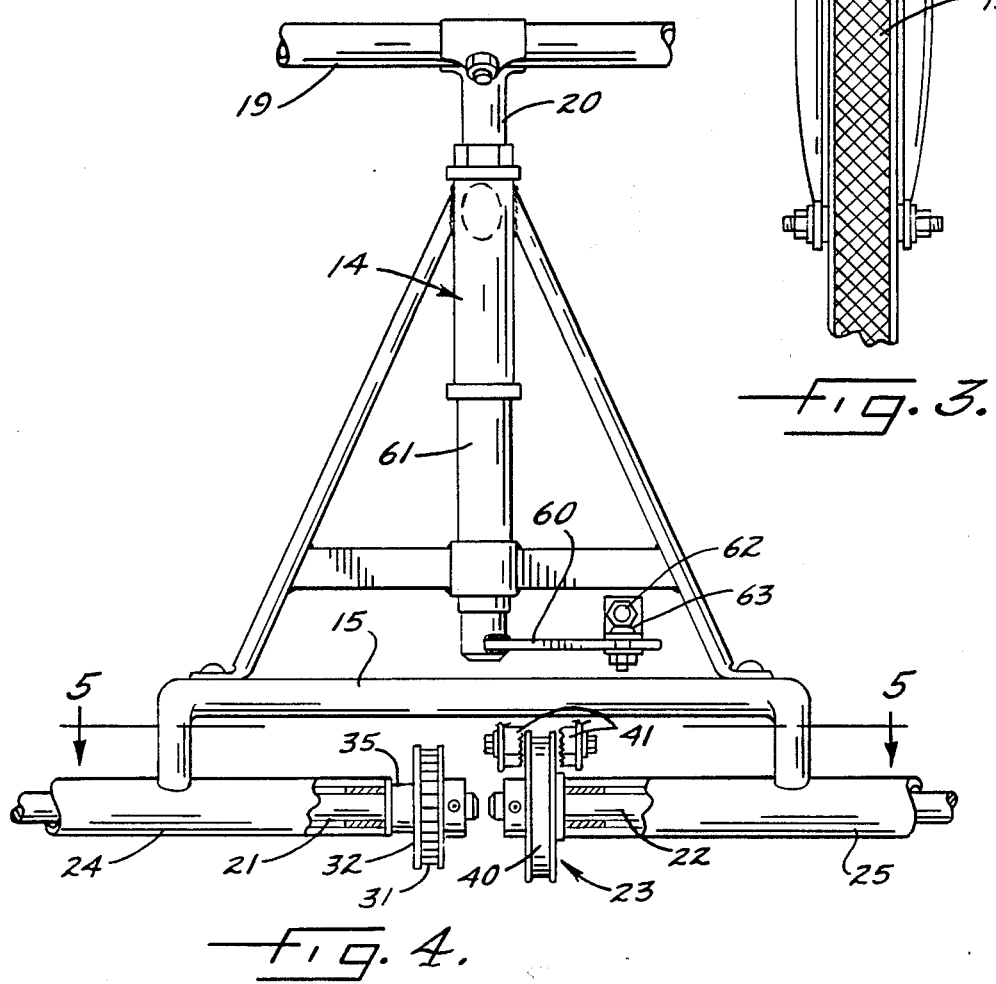
fig. 4.

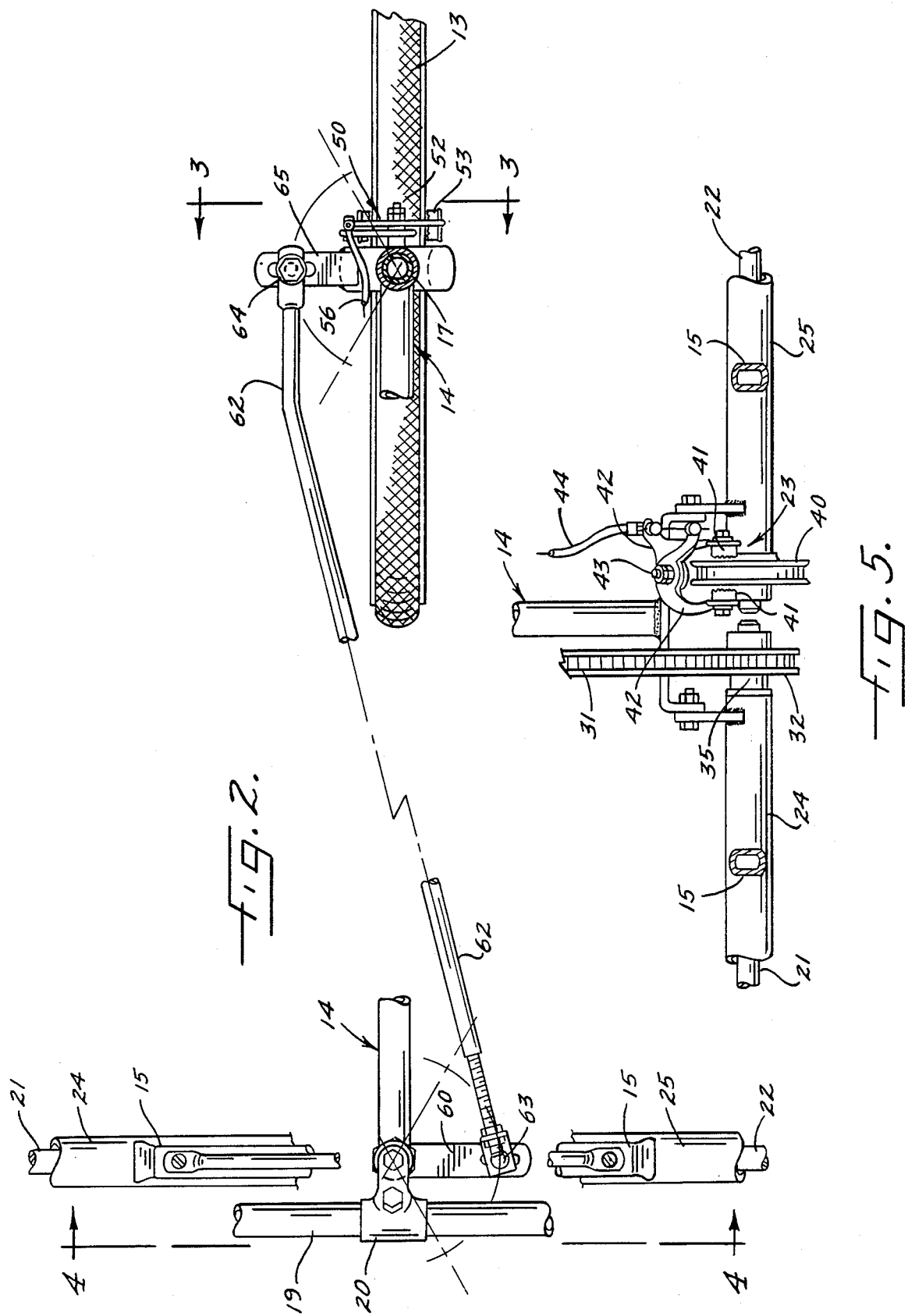

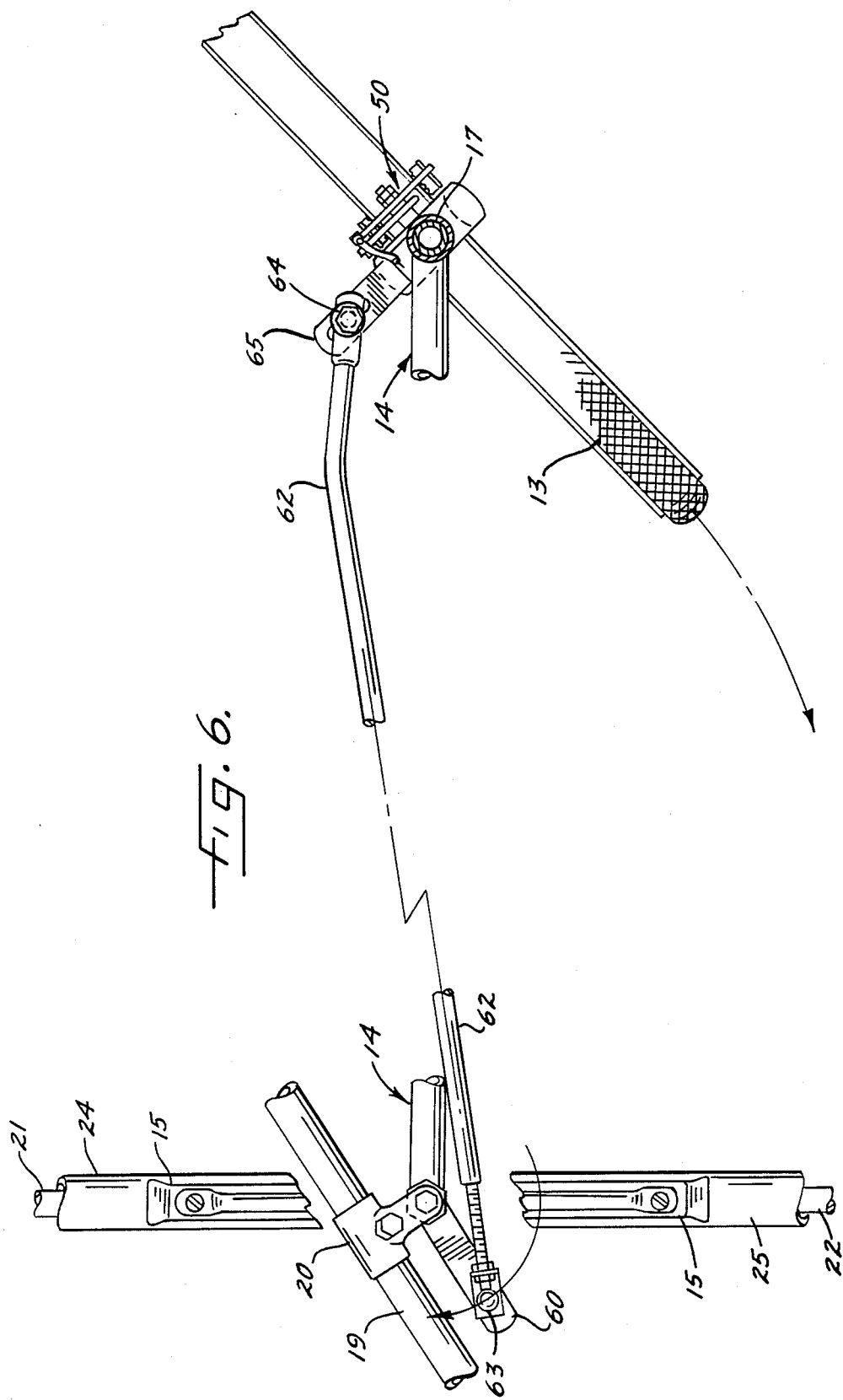

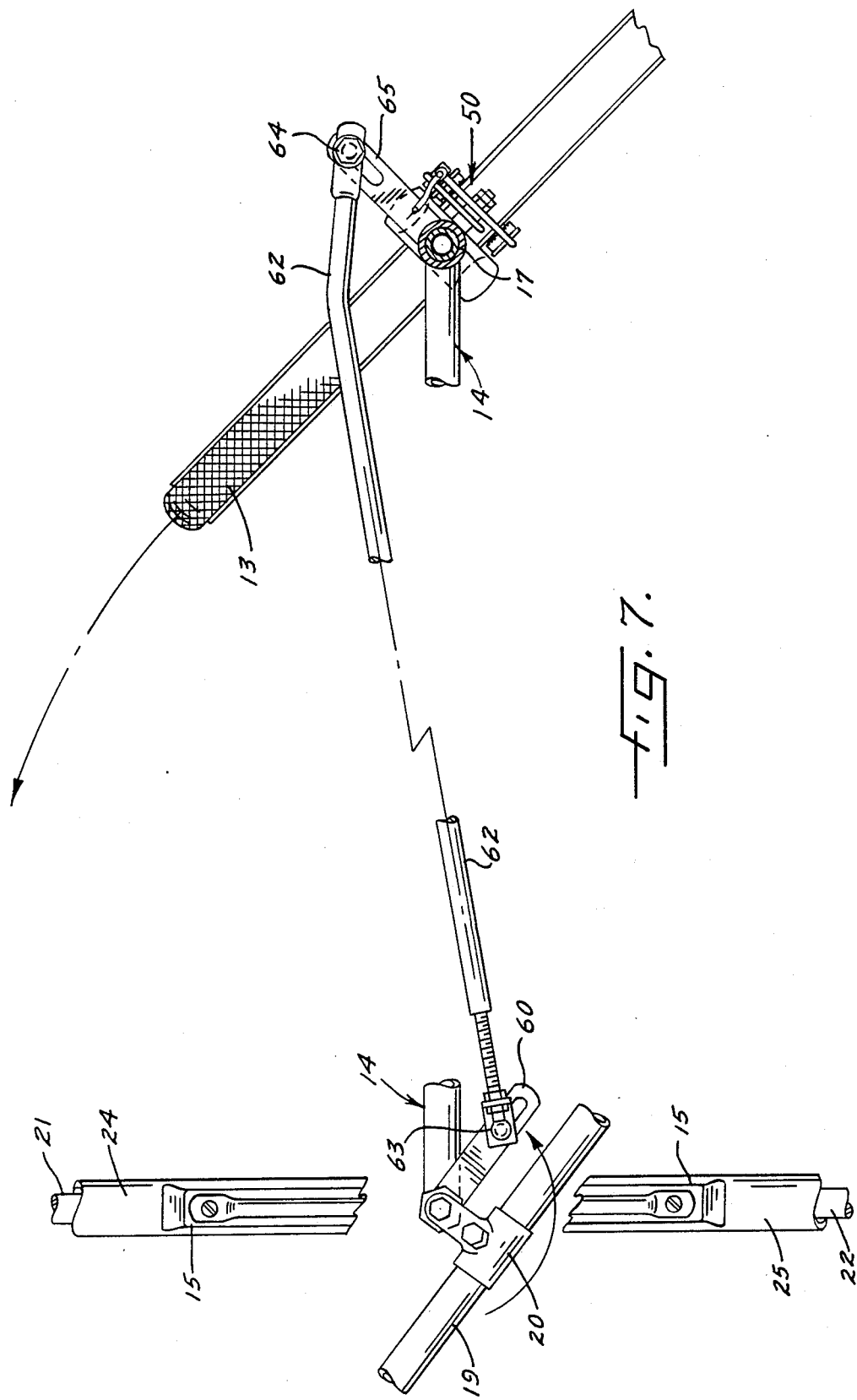

4,925,202

THREE-WHEELED PEDAL-PROPELLED CYCLE WITH FRONT AND REAR BRAKES

BACKGROUND OF THE INVENTION

This invention relates to a vehicle and, more particularly, to a pedal-propelled tricycle having two front wheels and a steerable rear wheel A tricycle of this general type is disclosed in Rettger, Jr. U.S. Pat. No. 3,403,927. That tricycle, however, assimilates an automobile.

SUMMARY OF THE INVENTION

The general aim of the present invention is to provide a tricycle which generally assimilates a bicycle in that the tricycle includes a bicycle-type handle bar, caliper brakes adapted to be actuated from the handle bar, and a pedal drive located between the front and rear wheels and adapted to be pumped in the same manner as the pedal drive of a bicycle.

A more detailed object of the invention is to provide a tricycle having one driven front wheel and one free front wheel, the wheels being independently rotatable to enable smooth cornering of the vehicle.

Still another object is to provide a tricycle having a caliper disc brake for braking the free front wheel.

The invention also resides in the provision of extremely simple means for steering the rear wheel when the handle bar is turned.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved tricycle incorporating the unique features of the present invention.

FIG. 2 is an enlarged fragmentary cross-section taken substantially along the line 2—2 of FIG. 1 and shows the handle bar and the rear wheel positioned to cause the tricycle to travel in a straight path.

FIG. 3 is an enlarged fragmentary rear elevational view of the tricycle shown in FIG. 1.

FIG. 4 is an enlarged fragmentary front elevational view of the tricycle shown in FIG. 1.

FIG. 5 is a fragmentary cross-section taken substantially along the line 5—5 of FIG. 4.

FIG. 6 is a view similar to FIG. 2 but shows the handle bar and the rear wheel positioned to cause the tricycle to turn in one direction.

FIG. 7 is also a view similar to FIG. 2 but shows the handle bar and the rear wheel positioned to cause the tricycle to turn in the opposite direction.

DETAILED DESCRIPTION OF THE PREFERRED EMBODIMENT

As shown in the drawings for purposes of illustration, the invention is embodied in a tricycle 10 of the type which includes two front wheels 11 and 12 and a steerable rear wheel 13. The tricycle includes a frame 14 consisting of a plurality of tubes which are suitably welded together. The frame supports a fork 15 for the front wheels and rotatably supports a crank 16 for a pedal drive and a fork 17 for the rear wheel. The crank of the pedal drive is located between the front wheels and the rear wheel while a seat 18 is located immediately above the crank. A bicycle-type handle bar 19 and a goose-neck 20 are located above the front fork 15.

In accordance with the primary aspect of the present invention, the wheels 11 and 12 are secured to rotate with independently rotatable axles 21 and 22 (FIGS. 4 and 5), respectively. The axle 21 is adapted to be rotated by the crank 16 of the pedal drive while the axle 22 is equipped with a brake 23 adapted to be operated from the handle bar 19.

More specifically, the axles 21 and 22 are journaled for rotation in transversely extending tubes 24 and 25 (FIGS. 4 and 5), respectively, which are secured to the lower end of the front fork 15. The wheels 11 and 12 are secured rigidly to the outboard end portions of the axles 21 and 22 and are connected for rotation in unison with the axles. As shown in FIG. 4, the inboard ends of the axles are spaced axially from one another.

To drive the wheel 11, a sprocket 30 is secured to the crank 16 and is connected by a chain 31 to a sprocket 32 which is operably connected to the inboard end portion of the axle 21. When the crank 16 is pumped in a direction to propel the tricycle 10 forwardly, the wheel 11 and the axle 21 are rotated by way of the sprocket 30, the chain 31 and the sprocket 32. The wheel 12, however, is not constrained to rotate in unison with the wheel 11 but instead rotates independently of the wheel 11 so as to be capable of turning slower than the wheel 11 when the tricycle is turned in one direction and faster than the wheel 11 when the tricycle is turned in the opposite direction.

The sprocket 32 is connected to the axle 21 by a conventional overrunning clutch 35 (FIG. 4) which causes the sprocket to drive the axle when the crank 16 is pumped in a direction to propel the tricycle 10 forwardly. When the sprocket 32 is held stationary, however, the clutch permits the axle 21 to overrun the sprocket so as to enable the tricycle to coast without backdriving the crank.

As shown in FIGS. 4 and 5, the brake 23 comprises a disc 40 which is secured to and projects radially from the inboard end portion of the axle 22. Friction pads 41 are located on opposite sides of the disc and are carried by caliper arms 42 (FIG. 5) which are pivotally connected to the frame 14 at 43. A cable 44 extends from the arms 42 to a brake-actuating lever 45 supported on the handle bar 19. When squeezed, the lever 45 acts through the cable 44 to swing the caliper arms 42 about the pivot 43 and thereby pinch the pads 41 against the disc 40 to apply a braking force to the axle 22.

A second brake 50 (FIG. 3) is associated with the rear wheel 13 and comprises a pair of caliper arms 51 pivotally connected to the fork 17 at 52 and carrying friction pads 53 which are located on opposite sides of the wheel 13. When a brake-actuating lever 55 on the handle bar 19 is squeezed, a cable 56 swings the arms 51 about the pivot 52 and causes the pads 53 to frictionally engage the rim of the rear wheel 13.

Provision is made of extremely simple means for steering the rear wheel 13 in response to turning of the handle bar 19. Herein, these means comprise a crank arm 60 (FIGS. 2 and 4) fixed to and extending in one direction (e.g., left) from the lower end of a vertically extending rod 61 which is connected rigidly to the goose-neck 20 of the handle bar and which is rotatably supported by the frame 14 to turn about a vertical axis. The forward end of an elongated link 62 (FIG. 2) is pivotally connected at 63 to the crank arm 60 while the rear end of the link is pivotally connected at 64 to a crank arm 65 which is connected rigidly to the rear fork 17. The arm 65 extends oppositely of the arm 60 (i.e., from the right of the fork 17) and thus the link 62 extends across the longitudinal centerline of the tricycle 10. When the handle bar 19 is turned to the right as shown in FIG. 6, the link 62 turns the rear wheel 13 to a position causing the tricycle to steer to the right. Conversely, the link positions the rear wheel to cause the tricycle to turn left when the handle bar is steered to the left as shown in FIG. 7.

I claim:

1. A tricycle having a steerable rear wheel and having first and second front wheels, first and second independently rotatable axles, said first and second wheels being connected to rotate with said first and second axles, respectively, a front handle bar supported to turn to different positions, mechanism connecting said handle bar to said rear wheel and operable to steer said rear wheel in response to turning of said handle bar, a foot-pumpable pedal drive positioned between said front wheels and said rear wheel, means connecting said pedal drive to said first axle and operable to rotate said first axle and said first front wheel when said pedal drive is pumped, a brake connected to said second axle and operable when applied to retard rotation of said second axle and said second front wheel, a manually operable brake actuator on said handle bar, and means coupling said actuator to said brake for applying said brake in response to operation of said actuator.

2. A tricycle as defined in claim 1 in which said brake comprises a disc projecting radially from and connected to rotate with said second axle, a pair of pivotally mounted caliper arms having friction pads located on opposite sides of said disc, said coupling means being operable to pivot said arms and pinch said pads against said disc when said brake actuator is operated.

3. A tricycle as defined in claim 1 further including a second brake associated with said rear wheel and operable when applied to retard rotation of said rear wheel, a second manually operable brake actuator on said handle bar, and means coupling said second actuator to said second brake for applying said second brake in response to operation of said second actuator.

4. A tricycle as defined in claim 1 in which said pedal drive comprises a rotatable crank having a sprocket wheel fixed thereto, said means for connecting said pedal drive to said first axle comprising a sprocket on said first axle and further comprising a chain connecting said sprocket wheel to said sprocket, and an overrunning clutch connecting said sprocket to said first axle and causing said sprocket to turn said first axle when said sprocket is driven by said chain, said clutch permitting said first axle to turn relative to said sprocket when said sprocket is held stationary.

5. A tricycle as defined in claim 1 in which a vertical rod is connected to rotate with said handle bar, a first crank arm projecting in one direction from said rod, a second crank arm projecting in the opposite direction from said rear wheel, said mechanism comprising a link extending between and connected pivotally to said crank arms.

* * * * *